(12) United States Patent
Pasko et al.

(10) Patent No.: US 11,532,432 B2
(45) Date of Patent: Dec. 20, 2022

(54) CHOKE WITH BUSBAR WINDING TURNS

(71) Applicant: Schaffner EMV AG, Luterbach (CH)

(72) Inventors: Szymon Pasko, Orzesze (PL); Marco Ranieri, Lupfig (CH); Jean-Pierre Greber, Kingersheim (FR)

(73) Assignee: Schaffner EMV AG, Luterbach (CH)

( * ) Notice: Subject to any disclaimer, the term of this patent is extended or adjusted under 35 U.S.C. 154(b) by 613 days.

(21) Appl. No.: 16/410,697

(22) Filed: May 13, 2019

(65) Prior Publication Data

US 2019/0371520 A1    Dec. 5, 2019

(30) Foreign Application Priority Data

May 14, 2018   (DE) ......................... 102018111468.0

(51) Int. Cl.
| | | |
|---|---|---|
| *H01F 27/02* | (2006.01) | |
| *H01F 37/00* | (2006.01) | |
| *H01F 27/28* | (2006.01) | |
| *H01F 27/24* | (2006.01) | |
| *H01R 4/02* | (2006.01) | |
| *H01R 4/30* | (2006.01) | |

(52) U.S. Cl.
CPC .......... *H01F 37/00* (2013.01); *H01F 27/022* (2013.01); *H01F 27/24* (2013.01); *H01F 27/2895* (2013.01); *H01R 4/021* (2013.01); *H01R 4/307* (2013.01)

(58) Field of Classification Search
CPC ........ H01F 37/00; H01F 27/022; H01F 27/24; H01F 27/2895; H01F 27/306; H01F 17/04; H01F 27/02; H01F 27/2828; H01F 38/12; H01F 27/42; H01F 2038/122; H01F 17/062; H01R 4/021; H01R 4/307; H01R 4/305; Y02T 10/70
See application file for complete search history.

(56) References Cited

U.S. PATENT DOCUMENTS

| | | | | |
|---|---|---|---|---|
| 5,214,403 | A | * 5/1993 | Bogaerts | ................. H01F 30/16 336/200 |
| 6,522,233 | B1 | * 2/2003 | Kyoso | ................... H01F 27/324 336/200 |
| 8,063,728 | B2 | 11/2011 | Brunel et al. | |
| 9,722,565 | B2 | 8/2017 | Beck | |

(Continued)

FOREIGN PATENT DOCUMENTS

| | | |
|---|---|---|
| CN | 105719788 A | 6/2016 |
| DE | 9303455 U1 | 10/1993 |

(Continued)

OTHER PUBLICATIONS

Wikipedia; https://de.wikipedia.org/wiki/Gewinde; Mar. 2019; 10 pages.

(Continued)

*Primary Examiner* — Mang Tin Bik Lian
(74) *Attorney, Agent, or Firm* — Blank Rome LLP (57) ABSTRACT

A choke comprising a core and a first power conductor, wherein the first power conductor comprises a first coil winding, having at least one complete turn about the core, characterized that at least one of the least one turns of the first coil winding comprises a rigid first busbar member and a rigid second busbar member.

19 Claims, 5 Drawing Sheets

(56) References Cited

U.S. PATENT DOCUMENTS

| | | | |
|---|---|---|---|
| 2008/0055035 A1* | 3/2008 | Gerhard | H01F 17/062 336/185 |
| 2009/0127857 A1 | 5/2009 | Feng et al. | |
| 2009/0128276 A1* | 5/2009 | Horowy | H01F 17/062 336/96 |
| 2010/0148901 A1 | 6/2010 | Powell et al. | |
| 2011/0215891 A1* | 9/2011 | Sundstrom | H01F 41/00 29/606 |
| 2013/0278369 A1* | 10/2013 | Shepard | H01F 5/04 336/90 |
| 2015/0061817 A1* | 3/2015 | Lee | H01F 17/062 336/221 |
| 2015/0228401 A1* | 8/2015 | Ratz | H01F 27/2895 336/198 |
| 2016/0181007 A1* | 6/2016 | Shiokawa | H01F 41/08 29/606 |
| 2018/0151288 A1* | 5/2018 | Piispanene | H01F 37/00 |
| 2018/0335068 A1* | 11/2018 | Ambros | F16B 25/0047 |
| 2019/0019613 A1* | 1/2019 | Navarro Pérez | H01F 27/32 |
| 2020/0013549 A1* | 1/2020 | Samuelsson | H01F 27/36 |

FOREIGN PATENT DOCUMENTS

| | | |
|---|---|---|
| JP | H-10-106861 A | 4/1998 |
| WO | WO-2017/085060 A1 | 5/2017 |

OTHER PUBLICATIONS

Chinese Office Action for CN Application No. 2019/103983676, dated Mar. 3, 2022, 12 pgs.

\* cited by examiner

CHOKE WITH BUSBAR WINDING TURNS

CROSS-REFERENCE TO RELATED APPLICATIONS

This application claims the benefit of German Patent Application No. 10 2018 111 468.0, filed May 14, 2018. The entire disclosure of which is hereby incorporated by reference.

TECHNICAL FIELD

The invention relates to a choke, specifically for DC networks in vehicles and/or for interference suppression, and specifically to a current-compensated choke.

PRIOR ART

Chokes, for example current-compensated chokes, are a significant constituent of interference suppression solutions in DC networks. The volume and weight of chokes generally increases in proportion to the inductance and the maximum current of the choke. In general, but specifically for application in motor vehicles, it is a concern that the volume and weight of chokes should be maintained as low as possible. At the same time, currents flowing in the DC networks of electric vehicles are very high, and chokes are expected to have high inductances.

The power of a choke is dependent upon its inductance. The power and/or inductance is dependent upon the core and the number of turns. The higher the number of turns, the greater the inductance, and thus the higher the power. This is problematic for applications involving high currents. These applications generally require very heavy gauge power conductors, generally realized in the form of busbars or special cables. For a current of 2.5 amperes (A) to 5 A, a busbar cross section of the order of 1 mm$^2$ or greater is required for a correspondingly braided and thus bendable cable. A 125 A application thus requires a busbar cross section of 25-50 mm$^2$. A busbar of this type can no longer be bent around a core.

Accordingly, for high-current chokes of this type, semi-wound chokes are generally preferred. In other words, a straight busbar is enclosed in an annular core. The inductance is thus exclusively dependent upon the material and the dimensions of the annular core. As a result, chokes of this type for high inductances, and thus for interference suppression applications involving high levels of interference suppression, are frequently exceptionally large and heavy.

Alternatively, for special applications, chokes are also employed having current windings, wherein the power conductor is constituted of finely braided, very heavy gauge stranded copper cables. However, these chokes are complex to produce, and are also voluminous, as the stranded copper cable is not close-fitted to the core. Moreover, a stranded copper cable of this type requires a larger cross section than a comparable busbar.

JPH10-106861 and U.S. Pat. No. 8,063,728 suggest therefore to provide a busbar winding around the core. This is done by connecting two pre-bent busbar members. However, those solutions have only one turn, because the busbar coil winding requires a lot of space. This is due to the large width of the busbars required by above-described cross-sectional surface requirements and due to the screw connections between two busbar members forming one turn. The screw connections are also cumbersome to close due to their position. The screw connections shown in U.S. Pat. No. 8,063,728 are further not suitable for use in a vehicle, because the vibrations in a care tend to open such screw connections with the time.

PRESENTATION OF THE INVENTION

The object of the invention is the identification of a choke for high currents with the lowest possible volume and weight, specifically for DC networks, and specifically for vehicles, According to the invention, this object is fulfilled by a choke according to claim 1.

As the at least one turn of the coil winding comprises at least one rigid first busbar member and a rigid second busbar member, a turn of a coil winding around a core can be realized in the form of a busbar. As a result, the busbar can be close-fitted to the core and, at the same time, the busbar permits the achievement of a smaller conductor cross section than is possible using stranded copper cables. A choke of equal inductance can thus assume a substantially more compact, and frequently a lighter, construction. At the same time, the production of a coil of this type, conversely to the winding of heavy gauge stranded copper cables, can be more easily automated. As one or each turn is comprised of (at least) two connected busbar members, the three-dimensional shape of the busbar winding can be achieved by means of connected busbar members, which are cut from a (two-dimensional) sheet material.

According to the invention, this object is fulfilled by a vehicle and/or by a DC voltage network having a choke of this type.

According to the invention, this object is fulfilled by a method for manufacturing a choke of this type. The method comprises the following steps: Arrangement of at least one first busbar member of a first coil winding of a first power conductor. Arrangement of a core relative to the at least one first busbar member. Connection of at least one second busbar member of the first coil winding of the first power conductor to the at least one first busbar member, such that the at least one first busbar member and the at least one second busbar member constitute the first coil winding of the first power conductor around the core.

Further advantageous configurations are described in the dependent claims.

In one exemplary embodiment, the core is annular, and comprises a first opening side, a second opening side arranged opposite the first opening side, an outer lateral side and an inner lateral side.

In the realization of the concept in product form, a series of issues arose with respect to effective manufacture, susceptibility to vibrations and the evacuation of heat, which have been resolved as follows, by means of the housing and the structural element described hereinafter.

In one exemplary embodiment, the choke comprises a housing.

In one exemplary embodiment, the housing comprises at least one projection wherein, in each of the at least one projections, a first busbar member of a turn of the first coil winding is arranged. This has an advantage, in that the first busbars are secured in the correct position by the projections during assembly, specifically where the core is arranged in the first busbar members. This simplifies and accelerates the assembly of the choke. At the same time, the clearance between the core and the first busbar member in relation to the housing wall is minimized, and the evacuation of heat is optimized accordingly. Specifically in combination with encapsulation, this form of construction minimizes the quantity of moulding compound, and thus the weight of the choke.

In one exemplary embodiment, the housing covers the first opening side and the outer lateral side of the core, wherein the at least one projection in the housing is arranged on the first opening side and/or on the outer lateral side.

In one exemplary form of embodiment, the shape of the housing on the first opening side matches the shape of the core on the first opening side (interrupted by the at least one projection) and/or the shape of the housing on the outer lateral side matches the shape of the core on the outer lateral side (interrupted by the at least one projection). By means of these characteristics, the first busbar members can be positioned at the correct winding angle and/or upright in relation to the annular core.

In one exemplary embodiment, the housing comprises an inner housing section, which covers the inner lateral side of the core. The inner housing section preferably comprises separating elements, which extend to the core, and are arranged such that a first busbar member and/or a second busbar member of a turn of the first coil winding is arranged between two adjoining separating elements, and/or a separating element is arranged between two adjoining turns of the first coil winding. The housing, on the inner lateral side of the core, can thus additionally assume positioning or insulating functions for the first and/or second busbar member(s). The inner housing section is preferably hollow. This reduces weight, specifically where the housing is encapsulated. The hollow inner housing section preferably communicates with the second opening side, such that an exchange of air occurs between the hollow housing section and the exterior. This improves the evacuation of heat from the inner lateral side of the core and the turn sections arranged thereupon.

In one exemplary embodiment, the choke comprises an electrically insulating structural element, which is arranged on the second opening side of the core between the second opening side and the at least one second busbar member. This structural element permits the insulation of the second opening side of the core from the second busbar members, the mutual insulation of the second busbar members and/or the correct positioning of the busbar members. The structural element preferably covers the second opening side of the core, at least in the region of the second busbar members. The structural element preferably incorporates a separating structure between two adjoining second busbar members. The separating structure preferably comprises a separating element, which extends in the direction of the inner housing section and, in combination with one of the separating elements of the inner housing section, insulates two adjoining turns from one another.

In one exemplary embodiment, the housing is encapsulated with the core and the first power conductor. Any inclusion of insulating air is thus precluded, thereby preventing the evacuation of heat and vibrations. The housing is preferably filled with moulding compound, such that (with the exception of the terminals), all the electrically conductive parts of the choke are covered by the moulding compound, and are thus insulated from the exterior. The housing is preferably configured in a cup shape, having an upper cup edge, wherein the cup edge (at its deepest point), is arranged above the core and the first and second busbar members (with the exception of the terminals), and wherein the housing is filled with moulding compound to a level below the cup edge.

In one exemplary embodiment, the first busbar member has a first end and a second end, and the second busbar member has a first end and a second end, wherein the second end of the first busbar member is connected to the first end of the second busbar member, such that the connected first and second busbar members constitute a turn of the first coil winding, comprising a rigid busbar from the first end of the first busbar member to the second end of the second busbar member. Accordingly, notwithstanding the wide diameter and the rigidity of the busbar members employed, a coil winding with a plurality of turns can be achieved, which is close-fitted to the core.

In one exemplary embodiment, the first end of the first busbar member is connected to an adjoining turn of the first coil winding or to a first terminal of the first coil winding, and/or the second end of the second busbar member is connected to another adjoining turn of the first coil winding or to a second terminal of the first coil winding.

For the electrically conductive connection of the first busbar member to the second busbar member, there is no satisfactory solution according to the prior art which permits good current conduction, secure retention and rapid assembly. On the grounds of space restrictions and the arrangement of the first and second busbar members around the core, the customary solution for the connection of busbars, involving a threaded through-bolt and a mating nut, is not applicable in this case.

In one exemplary embodiment, the second end of the first busbar member incorporates a fixing recess having an internal thread, wherein the first end of the second busbar member incorporates a through-hole, wherein the threaded bolt extends through the through-hole and is screwed into the internal thread of the fixing recess, such that a bolt head of the threaded bolt compresses the first end of the second busbar member against the second end of the first busbar member. By this solution, the necessary contact pressure between the first and second busbar members is achieved to ensure a good electrically conductive connection between the latter. As the threaded bolt is screwed into the first busbar member, no mating nut is required. At the same time, current can also flow via the bolt, with no reduction of the busbar diameter, as a good connection is provided via the thread flanks and the bolt head.

The threaded bolt is preferably a self-tapping threaded bolt, and the internal thread is constituted in the form dictated by the screwing of the self-tapping threaded bolt into the fixing recess. This has an advantage, in that the production of the first busbar member is considerably simplified, as the internal thread does not need to be additionally cut or moulded, but is formed by the screwing-in process. The contact surface area between a threaded bolt and the first busbar member is also greater in the case of self-tapping threaded bolts than in the case of metric bolts. Self-tapping threaded bolts with a self-tapping thread having a thread flank angle between 30° and 36° have proved to be particularly appropriate for this application.

In an alternative exemplary embodiment, the second end of the first busbar member is connected to the first end of the second busbar member by means of a solder paste. The solder paste is applied to both ends and, after the positioning thereof, is heated and soldered by induction. This process further simplifies the connection between the two busbar members.

Further advantageous exemplary embodiments are described hereinafter.

In one exemplary embodiment, the first busbar members of the first coil winding are arranged on a first opening side of the core, and the second busbar members are arranged on a second opening side of the core.

In one exemplary embodiment, the first busbar member assumes a U-shape, which is arranged around the core, and/or the second busbar member assumes an I-shape. The U-shape has an advantage, in that it extends around the core, and the core can be arranged in the U-shape. Moreover, this combination of U- and I-shapes is particularly advantageous, as the first end of the second busbar member can be more simply connected to the second end of the first busbar member than by the use of other shapes, e.g. two U-shapes. The combination of U- and I shapes has a further advantage in that, although both can be cut from sheet metal of equal thickness, as a result of the angle of the U to the I, there is no reduction of cross section in the connection region. Consequently, the second busbar member preferably incorporates a thickening in the region of its first and second ends.

In one embodiment, the main cross-sectional form of the first busbar member and the second busbar member is such that its first width in a first direction is between 0.5 (half) and 1.5 (one and a half) the size of its second width in a second direction (perpendicular to the first direction), preferably between 0.7 and 1.3, preferably between 0.8 and 1.2, preferably between 0.9 and 1.1. Compared to the flat busbars used in the state of the art, much space is saved to provide more windings through the opening of the core 4 without the need to increase the core 4. In addition, it allows to fix a distal end of a first busbar member to a second bus bar section which was not possible with the normal flat busbars of the state of the art.

The first coil winding, and any further coil windings, preferably comprise at least two turns.

In one exemplary embodiment, the choke comprises a second power conductor, wherein the second power conductor comprises a second coil winding, having at least one complete turn about the (same) core, wherein at least one of the at least one turns of the second coil winding comprises a rigid first busbar member and a rigid second busbar member.

In one exemplary embodiment, the first and the second coil winding are wound about the core such that the magnetic fluxes induced in the core by normal-mode currents in the first and second power conductors cancel each other out, and a current-compensated choke is constituted accordingly.

In one exemplary embodiment, the core is shaped as a hollow cylinder, preferably having a circular cross section at right angles to the cylinder axis. This shape results in the maximum volume of the annular core, and permits the use of simply shaped turns, In one exemplary embodiment, the choke is configured for a DC network.

In one exemplary embodiment, the choke is rated for a nominal current or maximum current in excess of 30 A, preferably in excess of 50 A.

In one exemplary embodiment, the first and/or second power conductor of the choke (respectively) has a minimum conductor cross-sectional surface area which is greater than 10 mm$^2$, preferably greater than 15 mm$^2$.

In one exemplary embodiment, the choke is a current-compensated choke.

In one exemplary embodiment, a vehicle comprises a DC network, wherein the DC network incorporates a choke.

In one exemplary embodiment, the at least one first busbar member is arranged in the projections of the housing, before the core is fitted into the at least one (preferably U-shaped) first busbar member.

In one exemplary embodiment, a threaded bolt is screwed through the first end of the second busbar member into the second end of the first busbar member, and is preferably a self-tapping threaded bolt, which cuts or screws an internal thread into the second end of the first busbar member, in order to connect said first busbar member to the second busbar member.

In one exemplary embodiment, a solder paste is applied between the first end of the second busbar member and the second end of the first busbar member, and is soldered thereafter. Preferably, soldering is achieved by means of the inductive heating of the solder paste.

The exemplary embodiments described are specifically advantageous in combination, but are also advantageous in isolation.

BRIEF DESCRIPTION OF THE FIGURES

The invention is described in greater detail with reference to the attached figures, in which.

EMBODIMENTS OF THE INVENTION

The choke according to the invention is preferably an noise-suppression choke. The choke is preferably employed in an noise-suppression filter, or as an noise-suppression filter. However, the choke can also be employed for other applications. The choke is preferably connected in series with the main power line. However, it is also possible for the choke to be connected in parallel with the main power line, or to be connected in a different arrangement. The choke is preferably employed in a DC voltage network (also described as a DC network). However, a choke of this type might also be employed in an AC voltage network (singlephase or three-phase). The choke is preferably rated for maximum or nominal currents greater than 30 A, preferably greater than 40 A, preferably greater than 50 A, preferably greater than 60 A, and preferably greater than 70 A. The choke is preferably a current-compensated choke, i.e. the at least two coil windings thereof are wound about the core such that magnetic fields generated in the core by differential-mode currents (useful current and/or differential-mode interference currents) in the at least two core windings cancel each other out. The current-compensated choke thus constitutes a low inductance for differential-mode currents, and a high inductance for common-mode currents. However, the choke described can also be used in applications for other chokes, e.g. for differential-mode chokes. The choke described was developed for use in a (motor) vehicle, specifically for a vehicle which is driven by an electric motor, such as a hybrid or electric vehicle, as the voltage networks thereof frequently carry very high currents. However, the choke described can also be employed in other applications.

FIGS. 1 to 6 describe a first exemplary embodiment of a choke of this type. The choke comprises a core 4, a first power conductor 10 and a second power conductor 20. The choke illustrated is a current-compensated choke, which is rated for a maximum or nominal current of 125 A. However, the following description also applies to other chokes and/or to other maximum or nominal currents.

The core 4 is a coil core. In this case, the core 4 is annular. However, in other forms of embodiment of the choke, the core 4 can also assume different shapes, e.g. a bar shape. In this case, the core 4 constitutes a closed ring, i.e. with no air gap. However, the term annular, in other exemplary embodiments, also includes annular cores 4 having an air gap. The annular core 4 has an opening. The two sides of the annular core 4 having the opening are described as the first and second opening sides. The opening side is preferably at right angles to the opening axis of the annular core 4. The annular core 4 preferably constitutes a circular ring. However, it is also possible for the annular core 4 to be configured as a triangular, rectangular, polygonal or ellipsoid ring, or as a ring of another shape. Here, the shape of the ring describes the shape of the perimeter, i.e. the outer, inner and/or central perimeter of the ring. The outward-facing side between the two opening sides is described as the outer lateral side. The inward-facing side between the two opening sides is described as the inner lateral side. The inner and/or outer lateral side is preferably arranged in parallel to the opening axis of the ring. The annular bead preferably has a rectangular cross section, such that the core 4 is configured as a straight hollow cylinder (in the case of a circular ring, as a straight circular cylinder). A rectangular cross section also includes a square-shaped cross section. A rectangular cross section, or a cross section having a different number of angles, should also incorporate rounded corners or edges. However, the cross section of the annular bead can also be circular (toroidal, in the case of a circular ring), ellipsoidal, or of another shape. However, a rectangular cross section of the annular bead and/or of the circular ring is particularly advantageous. In combination, these two shapes produce a particularly advantageous shape of the core 4 as a straight circular hollow cylinder, wherein the two base surfaces of the cylinder correspond to the first and second opening sides, the outer lateral side corresponds to the outer shell surface, and the inner lateral side corresponds to the inner shell surface. In this case, the opening axis corresponds to the axis of the hollow cylinder.

The material of the core 4 is preferably a material with high magnetic permeability in the desired frequency range, preferably a ferromagnetic material, e.g. a ferrite, a nanocrystalline material, etc.

The first power conductor 10 comprises a first coil winding 11. The coil winding 11 comprises at least one (complete) turn 12, preferably two or more turns 12, arranged about the core 4 (in this case, the annular bead of the core 4). The first coil winding 11 and/or the first power conductor 10 is constituted by a busbar. The busbar is formed of a solid conductive material. The conductive material is preferably a metal, preferably copper. The busbar is rigid, i.e. not bendable.

The first power conductor 10 preferably comprises a first terminal 13 and/or a second terminal 14. The first terminal 13 and/or the second terminal 14 is configured for connection to a power conductor, for example a busbar or a cable. The first terminal 13 and/or the second terminal 14 is preferably configured as a rigid busbar. The first terminal 13 and/or the second terminal 14 comprises coil connection means and external connection means. The coil connection means of the first terminal 13 are configured for connection to a first end of the coil winding 11, to a first turn 12 of the coil winding 11 and/or to a first end of the first busbar member 1 of the first turn 12 of the coil winding 11 The coil connection means of the second terminal 14 are configured for connection to a second end of the coil winding 11, to a final turn 12 of the coil winding 11 and/or to a second end of the first busbar member 1 of the final turn 12 of the coil winding 11. The external connection means of the first and/or second terminal 13 and/or 14 are configured for connection to a power conductor. The shape of the first and/or second terminal 13 and/or 14 extends in the direction of the opening axis, or at right angles to the second opening side, away from the first opening side. The external connection means therefore project out of the moulding compound (see below).

Figure 2:
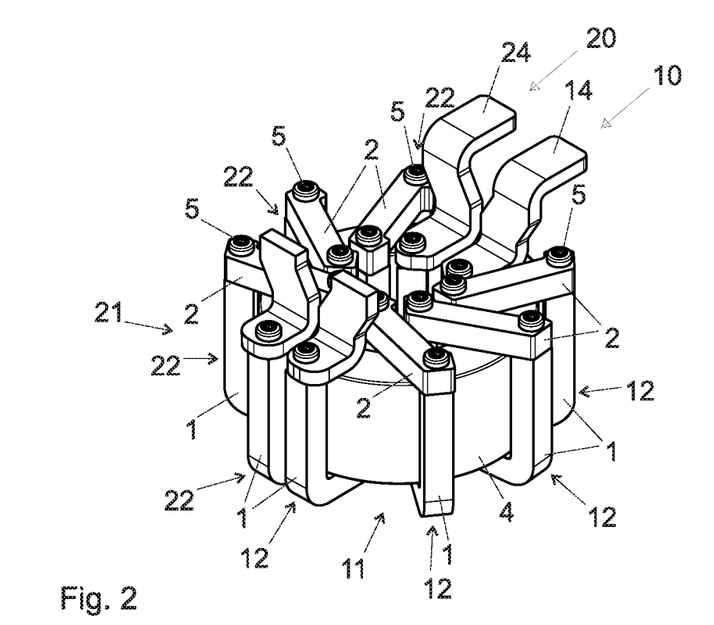
FIG. 2 shows a three-dimensional view of the first exemplary embodiment of the choke, with the housing and the moulding compound removed.
Figure 4:
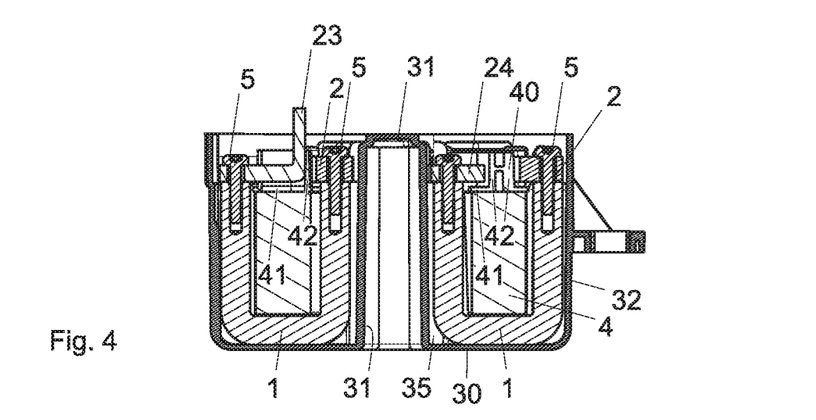
FIG. 4 shows a sectional view along line IV-IV of the first exemplary embodiment of the choke.
Figure 5:
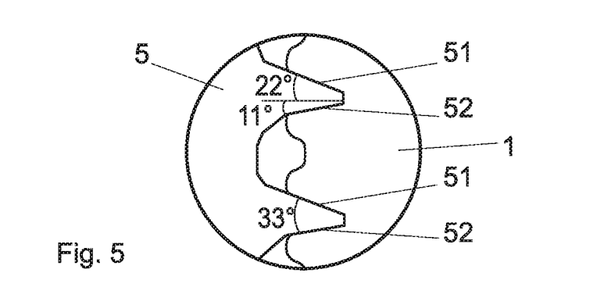
FIG. 5 shows a sectional view of a threaded bolt in the first busbar member.
Figure 6:
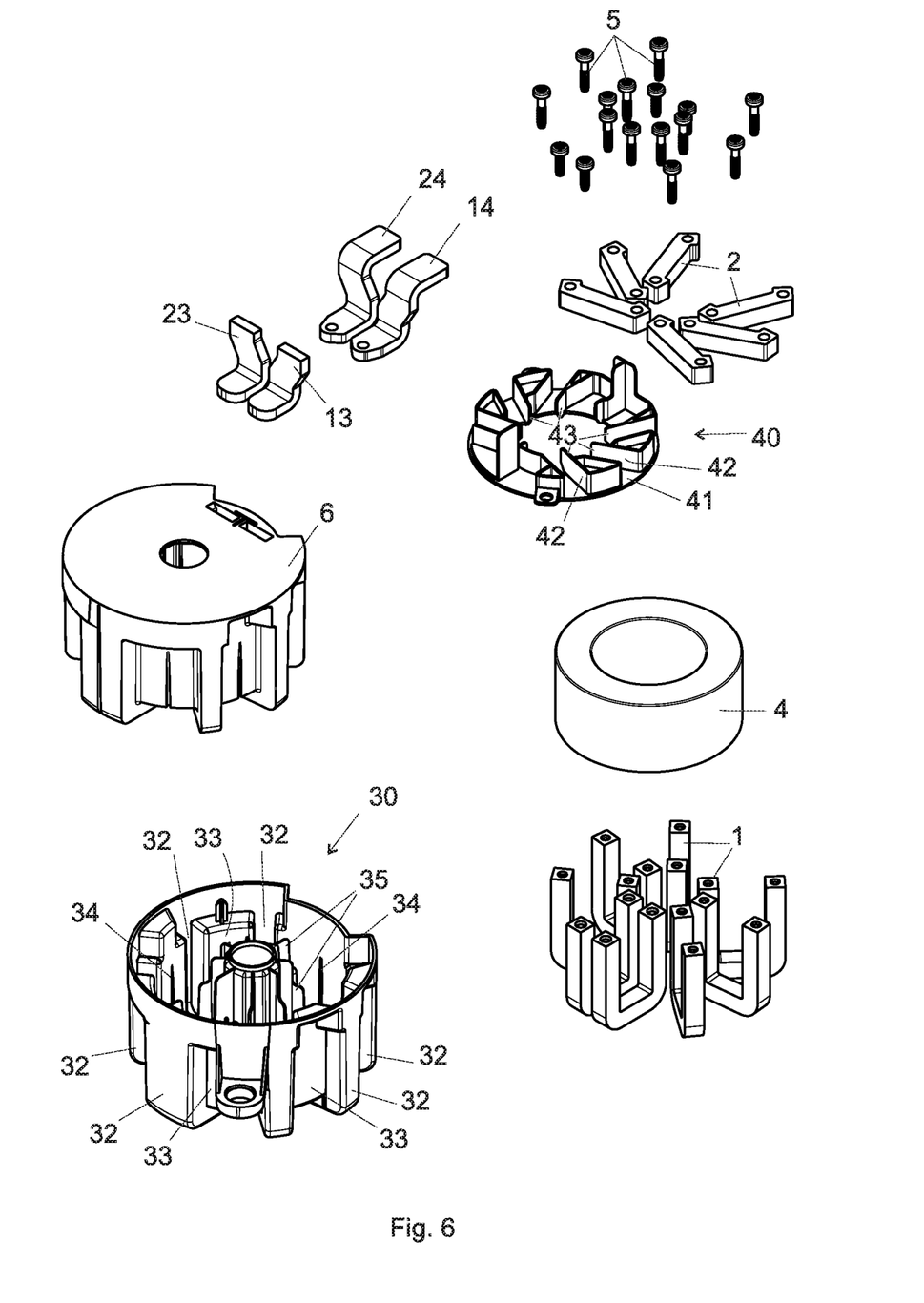
FIG. 6 shows an exploded view of the first exemplary embodiment of the choke.
Figure 7:
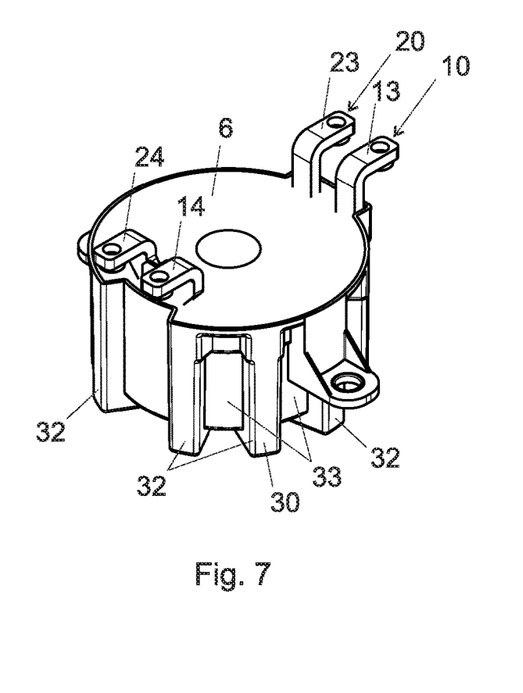
FIG. 7 shows a three-dimensional view of a second exemplary embodiment of a choke.
Figure 8:
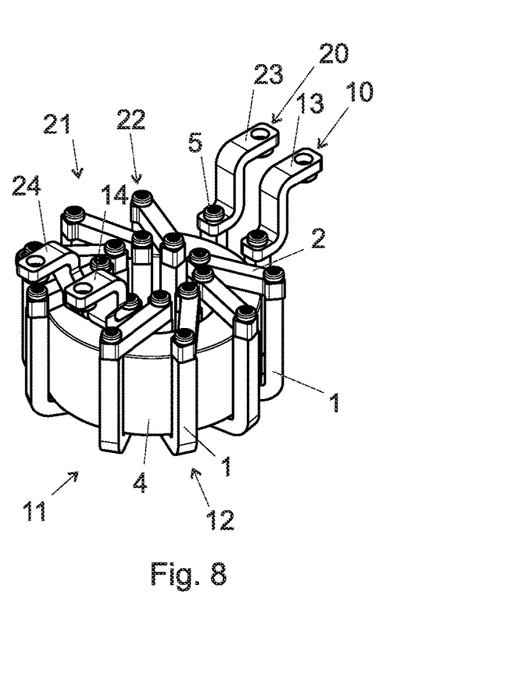
FIG. 8 shows a three-dimensional view of the second exemplary embodiment of the choke, with the housing and the moulding compound removed.
Figure 9:
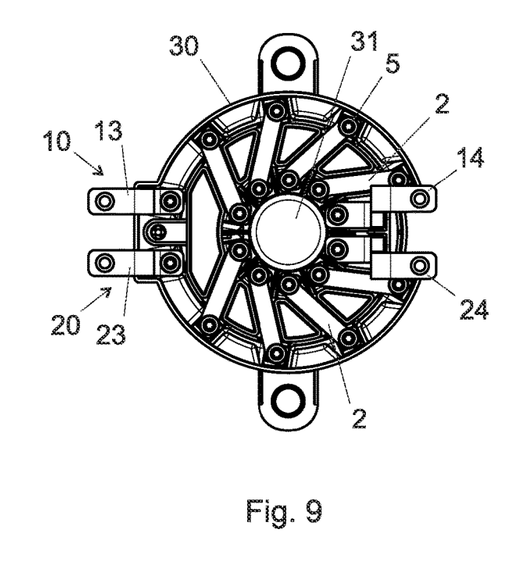
FIG. 9 shows an overhead view of the second exemplary embodiment of the choke, with the moulding compound removed.
Figure 10:
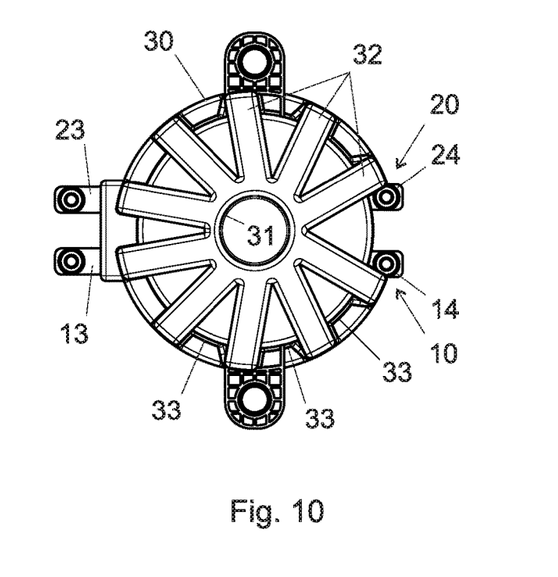
FIG. 10 shows a view of the underside of the second exemplary embodiment of the choke.
Figure 11:
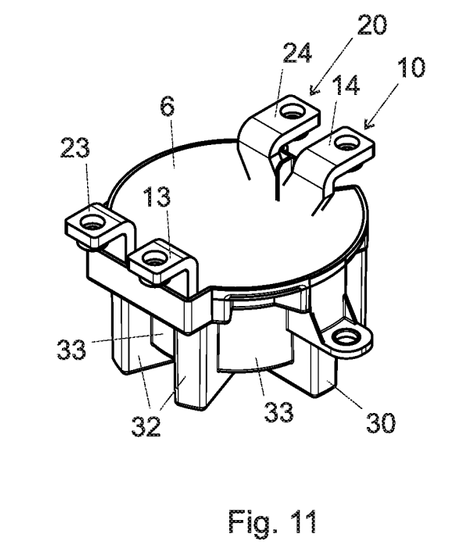
FIG. 11 shows a three-dimensional view of a third exemplary embodiment of a choke.
Figure 12:
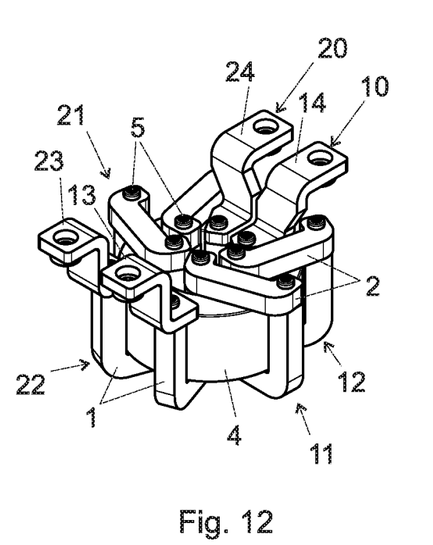
FIG. 12 shows a three-dimensional view of the third exemplary embodiment of the choke, with the housing and the moulding compound removed.
Figure 13:
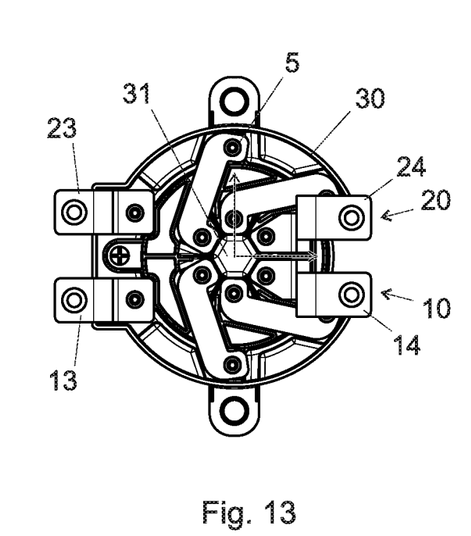
FIG. 13 shows an overhead view of the third exemplary embodiment of the choke, with the moulding compound removed.
Figure 14:
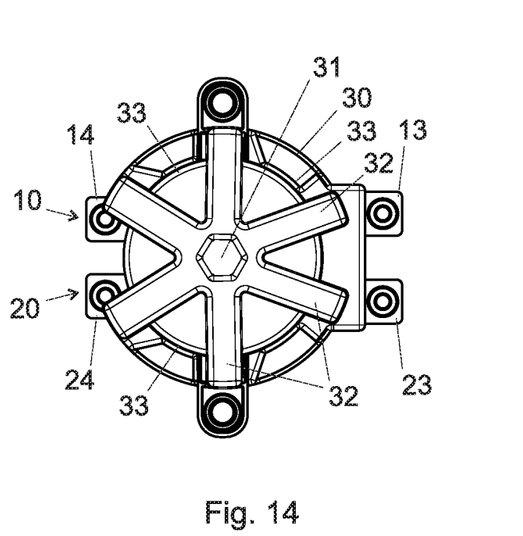
FIG. 14 shows a view of the underside of the third exemplary embodiment of the choke.

At least one of the turns 12, preferably the majority of turns 12, and preferably each turn 12 comprises a first busbar member 1 and a second busbar member 2. Preferably, the first busbar member 1 and the second busbar member 2 constitute the respective turn 12. However, it is also possible that one or more turns 12 are respectively comprised of more than two busbar members. The first busbar member 1 and the second busbar member 2 are shaped and connected such that, in combination (where applicable, with one or more further busbar members) they constitute a turn 12 about the core 4. Preferably, the shape of the turn 12 essentially corresponds to the cross-sectional shape of the core 4, i.e. in the case of an annular core 4, the cross section of the annular bead (just a little-bit bigger). Preferably, the main cross-sectional form of the first busbar member 1 and the second busbar member 2 is such that its first width in a first direction is between 0.5 (half) and 1.5 (one and a half) the size of its second width in a second direction (perpendicular to the first direction), preferably between 0.7 and 1.3, preferably between 0.8 and 1.2, preferably between 0.9 and 1.1. Compared to the flat busbars used in the state of the art, much space is saved to provide more windings through the opening of the core 4 without the need to increase the core 4. In addition, it allows to fix a distal end of a first busbar member 1 to a second bus bar section 2 which was not possible with the normal flat busbars of the state of the art. The main cross-sectional form of the first busbar member 1 and the second busbar member 2 is preferably rectangular, preferably square-shaped. However, other shapes are also possible. The main cross-sectional form of the first busbar member 1 and the second busbar member 2, respectively, refers to the cross-sectional form of the first busbar member 1 and the second busbar member 2, respectively, used principally along the length of the first busbar member 1 and the second busbar member 2, respectively, preferably used along at least 50%, preferably at least 70%, preferably at least 80% of the length of the first busbar member 1 and the second busbar member 2, respectively.

Preferably, the first busbar member 1 assumes a shape which extends along the inner lateral side, the first opening side and the outer lateral side of the core 4. Preferably, the internal shape of the first busbar member 1 matches the external shape of the core 4 on the inner lateral side, the first opening side and the outer lateral side. Preferably, the first busbar member 1 assumes a U-shape. Thus, the U-shaped first busbar member 1 extends along at least a part of the inner lateral side and/or at least a part of the outer lateral side of the core 4. As a result, the core 4 can be fitted/recessed in the first busbar member 1. Preferably, the first busbar member 1 extends along the entire inner lateral side and/or the entire outer lateral side of the core 4, preferably extending a bit even beyond the core 4. At least one of the two ends of the first busbar member 1 can then be connected by means of a straight second busbar member 2 (parallel to the second opening side) to a further turn 12 and/or to a further first busbar member 1 of a further turn 12. This permits the simpler configuration of the second busbar members 2 and/or the simplification of the connection of the first and second busbar members. However, it is also possible for the first busbar member 1 not to extend, or to only partially extend, beyond the outer lateral side and/or the inner lateral side. In this case, the first busbar member 1 might assume, for example, a (shorter) U-shape, an L-shape or an I-shape or an (asymmetric) U-shape with two U-legs of different lengths. The main cross-sectional form of the first busbar member 1 is preferably rectangular (e.g. quadrilateral). However, other shapes are also possible. The first busbar member 1 has a first end and a second end. The first busbar member 1 has a longitudinal axis which extends along the direction of the current flow in the first busbar member 1. For the U-shaped first busbar member 1, the longitudinal axis has a U-shape. The first busbar member 1 has at least one lateral side being substantially parallel to the longitudinal axis and two distal sides at the two ends of the first busbar member 1 cutting through the longitudinal axis of the first busbar member 1. Preferably, the two distal sides are orthogonal to the longitudinal axis. The at least one lateral side has preferably four lateral sides. The distal sides are preferably flat.

Figure 3:
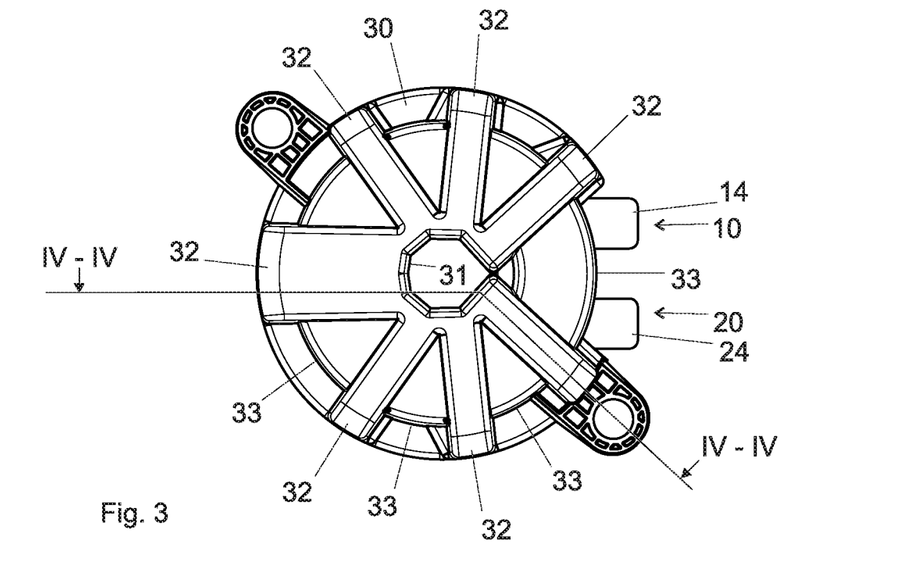
FIG. 3 shows a view of the underside of the first exemplary embodiment of the choke.

Preferably, the second busbar member 2 assumes a shape which extends along the second opening side of the core 4. Preferably, the internal shape of the second busbar member 2 matches the external shape of the core 4 on the second opening side. Preferably, the first busbar member 1 assumes an I-shape (for a U-shaped first busbar member 1 which extends along the entire inner and outer lateral side of the core 4). The main cross-sectional form of the second busbar member 2 is preferably rectangular (e.g. quadrilateral). However, other shapes are also possible. The second busbar member 2 can be for example L-shaped (e.g. if the first busbar member 1 is asymmetrically U-shaped with one U-leg extending along the entire inner or outer lateral side of the core 4 and another U-leg extending only a part of the other one of the lateral sides, of if the first busbar member 1 is L-shaped). The second busbar member 2 can be for example U-shaped (e.g. if the first busbar member 1 is U-shaped with the U-legs extending only along a part of the inner and outer lateral side of the core 4). The second busbar member 2 has a longitudinal axis which extends along the direction of the current flow in the second busbar member 2. For the I-shaped second busbar member 2, the longitudinal axis would be a straight line. The second busbar member 2 has at least two lateral sides being substantially parallel to the longitudinal axis (and two distal sides at the two ends of the second busbar member 2 cutting through the longitudinal axis of the second busbar member 2). One of the at least two lateral sides of the second busbar member 2 is preferably flat. The at least two lateral sides have preferably four lateral sides. Preferably, the second busbar member 2 is expanded in the connection region with the first busbar member 1 and/or at both ends. This expansion is arranged in the (parallel) plane of the second opening side. The expansion is configured such that the expanded region covers the entire conductor cross section of the end of the, or of a, first busbar member 1 which is connected to the expansion. The second busbar member 2 has a first end and a second end.

The second end of the first busbar member 1 is connected to the first end of the second busbar member 2. The connection is configured such that an electrically conductive connection and/or mechanically rigid/inflexible and/or stable connection is constituted between the first and second busbar members 1 and 2 of the respective turn 12. By the connection of the second end of the first busbar member 1 to the first end of the second busbar member 2, the respective turn 12 of the first coil winding 11 is (preferably entirely) constituted as a rigid busbar from the first end of the first busbar member 1 to the second end of the second busbar member 2. Preferably, the distal side of the second end of the first busbar member 1 is connected to the first end of the second busbar member 2. This allows less space-consuming connections between the first busbar members 1 and the second busbar members 2. In one embodiment, the distal side of the second end of the first busbar member 1 is connected to the lateral side of the first end of the second busbar member 2 (as would be the case for an I-formed or L-shaped second busbar member 2). In one embodiment, the distal side of the second end of the first busbar member 1 is connected to the distal side of the first end of the second busbar member 2 (as would be the case for a U-formed or L-shaped second busbar member 2). Preferably, the first end of the first busbar member 1 a first end of this turn 12 of the first coil winding 11 and/or the second end of the second busbar member 2 provides a second end of this turn 12. Preferably, the first end of the first busbar member 1 is connected to (a second end of) an adjoining turn 12 of the first coil winding 11, or to the first terminal 13 of the first coil winding 11. Preferably, the second end of the second busbar member 2 is connected to (a first end of) another adjoining turn 12 of the first coil winding 11. Accordingly, by the series connection of various turns 12, or by the alternating connection of the first busbar members 1 and the second busbar members 2, the first coil winding 11 is constituted by a rigid busbar. Preferably, the majority (preferably) all of the first busbar members 1 of the first coil winding 11 (and of any further coil windings 21) are of an identical design. Preferably, the majority (preferably all bar one) of the second busbar members 2 of the first coil winding 11 (and of any further coil windings 21) are of an identical design. Preferably, the second busbar member of the final turn 12 of the first coil winding 11 is constituted by the second terminal 14. However, it is also possible for the second busbar member of the final turn 12 to be configured identically to the other turns 12, and for the second terminal 14 to be connected to the second end of the second busbar member 2. The first coil winding 11 is preferably shaped such that the first busbar member(s) 1 are essentially oriented radially to the opening axis and/or (most of) the second busbar members 2 are oriented along a line of connection between two radial lines (such that the second end of the first busbar member 1 is connected to the first end of the second busbar member 2). The final (or first) second busbar member 2 in the coil winding 11, which is configured here, for exemplary purposes, as a terminal 14, is preferably oriented approximately radially to the opening axis of the core 4.

For the connection of one end of the first busbar member 1 to one end of the second busbar member 2 (or connection between one end of the busbar members 1 or 2 and one of the coil connection means of the terminals 13 or 14), various connection techniques are possible. The connection can be formed by screwing, welding (resistance welding, laser welding, etc.), soldering, press-fitting, etc. In consideration of the number of connection points and/or the importance of good electrical connection, however, it is extremely important that this connection technique should be rapid, provide good conduction and/or be mechanically stable. Otherwise, manufacture will be excessively complex and/or hotspots will occur on connections, if the quality of connection is not sufficient. The following two connection techniques have proved to be particularly appropriate. Those connection techniques are particularly advantageous for connecting the distal side of the first busbar member 1 to the (lateral or distal side) of the second busbar member 2. The state of the art does not provide a rapid, robust and well-conductive connection technique for connecting a distal side of a busbar.

According to a first connection technique, the second end of the first busbar member 1 incorporates a fixing recess with an internal thread. Preferably, the fixing recess is in the distal surface of the second end of the first busbar member 1. Preferably, the fixing recess is a blind hole. Preferably, the fixing recess extends parallel to the longitudinal axis of the first busbar member 1 at its second end. The first end of the second busbar member 2 incorporates a through-opening. The through-opening extends preferably through at least one lateral side of the second busbar member 2 at its first end. In one embodiment, through two lateral sides of the second busbar member 2 (as the case for I-shaped or some L-shaped second busbar members 2). In one embodiment, through one lateral side and one distal side of the second busbar member 2 (as the case for U-shaped or some L-shaped second busbar members 2). A threaded bolt 5 extends through the through-opening and is screwed into the internal thread of the fixing recess. In one embodiment, the through-opening has no internal thread. In another embodiment, the through-opening has also an internal thread. Preferably, the longitudinal axis of the fixing recess of second end of the first busbar member 1, the longitudinal axis of the through-opening of first end of the second busbar member 2 and/or the longitudinal axis of the threaded bold 5 extend(s) parallel to the longitudinal axis of the first busbar member 1 at its second end. That means that the threaded bolt 5 is screwed in the direction of the U-leg or of longitudinal axis of the first busbar member 1. Therefore, the connection depth of the threaded bold 5 is much higher as in the fiat busbars which are screwed together with their fiat lateral sides. This provides a more robust connection and a good connectivity. In addition, the threaded bold 5 can be screwed from one of the opening sides of the core 4 such that an easy and rapid manufacturing can be provided. As a result, a bolt head of the threaded bolt 5 presses the end of the second busbar member against the end of the first busbar member 1. Particularly advantageously, a self-tapping threaded bolt 5 (also described as self-piercing) is employed, which itself cuts or pierces the internal thread in the fixing recess upon the screwing-in thereof. This reduces the complexity of manufacture, and simultaneously improves retention and electrical connection between the connected busbar member. The self-tapping threaded bolt 5 comprises a thread (see FIG. 5). The thread preferably has a thread flank with a thread flank angle between 30° and 36°, in this case 33°. The overall flank angle is constituted between the upper flank 51 of the thread and the lower flank 52. The upper flank 51 is the flank of the thread which faces the bolt head, and the lower flank 52 is the flank of the thread which is averted from the bolt head. Preferably, the upper flank angle is greater than the lower flank angle. The upper flank angle is constituted between the upper flank 51 and the plane orthogonal to the screwing-in direction. The lower flank angle is constituted between the lower flank 52 and the plane orthogonal to the screwing-in direction. The upper flank angle is preferably between 20° and 24°, preferably 22°. The lower flank angle is preferably between 10° and 12°, preferably 11°.

According to a second advantageous connection technique, one end of the first busbar member 1 is connected to one end of the second busbar member 2 (or of the terminal 13, 14) by means of a solder paste, which is preferably soldered by inductive heating. Preferably, the distal side of the second end of the first busbar member 1 is soldered with the solder paste to (the lateral or distal side of) the first end of the second busbar member 2. Since it is difficult to reach the connection surface of the distal side of the first busbar member 1 and the (distal or lateral side of the) second busbar member 2, this technique is well adapted for a simple and rapid processing.

The description of the turn 12 with the first busbar member 1 and the second busbar member 2 applies analogously to some, preferably all turns 12 of the coil winding 11 of the first power conductor 10.

The first power conductor 10, the coil winding 11, the turn 12, the first busbar member 1, the second busbar member 2, the first terminal 13 and/or the second terminal 14 has/have a (minimum) conductor cross section which is selected on the basis of the nominal or maximum current of the choke. Preferably (depending upon the material of the power conductor 10, the coil winding 11, the turn 12, the first busbar member 1, the second busbar member 2, the first terminal 13 and/or the second terminal 14), 1 mm$^2$ is provided per 2.5 A-5 A. Preferably, the above-mentioned (minimum) conductor cross section is greater than 10 mm$^2$, preferably greater than 15 mm$^2$, preferably greater than 20 mm$^2$, and preferably greater than 30 mm$^2$.

The second power conductor 20 comprises a second coil winding 21. The second coil winding 21 comprises at least one (complete) turn 22, preferably two or more turns 22, arranged about the core 4 (in this case, the annular bead of the core 4). Preferably, the second power conductor 20 comprises a first terminal 23 and/or a second terminal 24. At least one of the turns 22, preferably the majority of turns 22, and preferably each turn 22 comprises a first busbar member 1 and a second busbar member 2. The characteristics, either individually or in combination, of the second power conductor 20, the second coil winding 21, the turn(s) 22, the first terminal 23 and the second terminal 24 correspond to the corresponding characteristics of the first power conductor 10, the first coil winding 11, the turn(s) 12, the first terminal 13 and the second terminal 14, and the description thereof will not be repeated here. Preferably, the first coil winding 11 is arranged in mirror symmetry (relative to a plane through the opening axis) to the second coil winding 21.

In other exemplary embodiments, the choke can also comprise only one power conductor, and thus only one coil winding, or can comprise three or more power conductors, and thus three or more coil windings. Each of these power conductors and coil windings are preferably of an analogous design to the first power conductor and the first coil winding.

Figure 1:
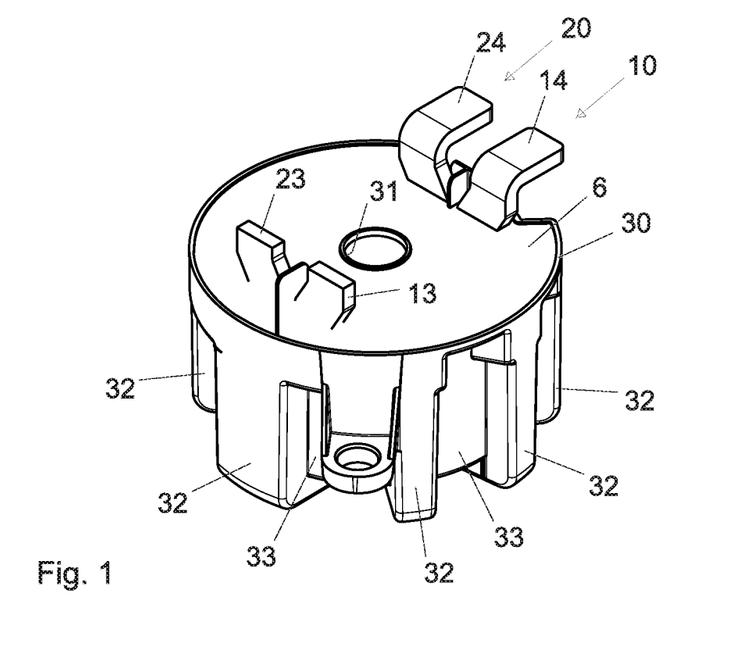
FIG. 1 shows a three-dimensional view of a first exemplary embodiment of a choke.

The choke preferably comprises a housing 30, in which the core and the coil windings 11 and 12 are accommodated. The housing wall of the housing 30 on the first opening side of the core 4 is preferably also described as the first opening side of the housing 30. The side of the housing 30 on the second opening side of the core 4 is preferably also described as the second opening side of the housing 30. The housing wall of the housing 30 on the outer lateral side of the core 4 is preferably also described as the outer lateral side of the housing 30. The housing 30 is preferably configured to a cup-shaped or pot-shaped design, such that the housing 30 can be encapsulated in combination with the core and the coil windings 11 and 12 (potting). This means that the housing 30 is closed on the first opening side and the outer lateral side. Conversely, the housing 30 is open on the second opening side, such that the core 4 and the coil winding(s) 11 and 12, or elements thereof, can be inserted from the second opening side into the housing 30 and/or the housing 30 can be filled with a moulding compound. The housing wall(s) on the first opening side and the outer lateral side is (are) thus closed (in a leak-tight manner), such that a fluid, specifically a moulding compound, cannot escape from the housing on the first opening side and the outer lateral side upon the injection thereof into the housing.

The housing 30 preferably comprises an inner housing section 31, which extends through the opening of the annular core 4. Preferably, the inner housing section 31 is constituted by a housing wall on the inner lateral side of the core 4. This inner housing section 31 is preferably open to the first or second opening side, and preferably to the first opening side. This improves the evacuation of heat. However, it is also possible for the inner housing section 31 to be a closed hollow structure, or filled with a moulding compound 6.

The housing 30, specifically the first opening side thereof, the outer lateral side thereof and/or the inner lateral side thereof, is shaped such that the first busbar members 1 (and additionally, where applicable, the second busbar members 2) and/or the core 4 are secured, positioned and/or oriented by the housing 30. This permits the simple, reproducible and rapid assembly of the choke. To this end, the first busbar members 1 are fitted in the housing 30, and are secured by the latter in the correct position. The core 4 can now be fitted in the housing 30 (and in the first busbar members 1). As the housing 30 assumes the function of the correct positioning of the core 4 and the first busbar members 1, assembly is very straightforward.

The housing 30, on the first opening side and/or on the outer lateral side, preferably comprises projections 32 for the first busbar members 1. By means of these projections 32, the first busbar members 1 are secured in position. Preferably, the basic shape of the housing 30, on the first opening side and/or the outer lateral side, preferably matches the corresponding shape of the core 4, preferably in parallel to the latter. The clearance between the housing wall of this basic shape and the core 4 is preferably greater than 1 mm, preferably greater than 3 mm, and preferably greater than 5 mm. The clearance between the housing wall of this basic shape and the core 4 is preferably smaller than 10 mm, preferably smaller than 7 mm, preferably smaller than 5 mm, and preferably smaller than 3 mm. This basic shape is preferably a straight circular cylinder, preferably a hollow cylinder. The basic shape is interrupted by the above-mentioned projections. The projections are preferably arranged in a plane radial to the opening axis (with slight deviations). Preferably, each projection is configured for the retention of (only) one first busbar member 1. In the first exemplary embodiment, a common projection 32 is provided for the first (alternatively, for the last) turn 12 of the first coil winding 11 and for the first (alternatively, for the last) turn 22 of the second coil winding 21. The projections 32 firstly execute the above-mentioned positioning of the first busbar members 1. However, the projections 32 have a further advantage, in that heat from the first busbar members 1 can be directly evacuated via the projection 32 and/or heat from the core 4 can be rapidly evacuated via the basic shape to the outer side of the housing 30, as the evacuation paths involved are short. The clearance between the housing wall of the projections 32 and the first busbar member 1 is preferably greater than 1 mm, preferably greater than 3 mm, and preferably greater than 5 mm. The clearance between the housing wall of the projections 32 and the first busbar member 1 is preferably smaller than 10 mm, preferably smaller than 7 mm, preferably smaller than 5 mm, and preferably smaller than 3 mm. The shape of the housing 30 thus described, having a basic shape 33 and projections 32, has a further advantage in that, upon the encapsulation of the choke 1, the quantity of moulding compound 6 is minimized, thereby reducing weight. Preferably, the housing 30, on the inner side (facing the core 4) of the inner lateral side of the housing 30 or of the inner housing section 31, incorporates blades 35, which retain the first busbar member 1 in position. Preferably, the blades 35 (radially to the opening axis of the core 4) extend into the interior of the housing 30. Preferably, between two adjoining first or second busbar members 1, 2 and/or between two adjoining turns 12, 22, one such blade 35 is arranged in each case. Preferably, (a number, the majority, all of) the first or second busbar members 1, 2 and/or adjoining turns 12, 22 are delimited and/or retained on either side by a blade 35.

The housing 30 comprises, on the inner side of the outer lateral side, blades 34 and/or, on the inner side of the inner lateral side (facing the core 4), blades 35 which maintain the core 4 in position. The blades 35 are preferably the same which also retain or separate the busbar members 1, 2 and/or the turns 12, 22. This reduces vibrations in the finished choke, and simplifies the accurate positioning of the core 4. Preferably, the blades 34 and/or 35 are configured with a slight wedge shape (wherein the clearance from the blades 34 and 35 to the first opening side is narrower than to the second opening side), such that the core 4 can be simply inserted from the second opening side, and can be routed to an accurate position on the second side. Preferably, the clearance from the blades 34 and 35 to the first opening side is somewhat narrower than the width of the core 4 (specifically the annular bead thereof), such that the core 4 is arranged in a press-fit between the blades 34 and 35. The blades 34 are preferably configured on the inner side of the basic shape of the outer lateral wall (and extend radially into the interior of the housing 30). The blades 34 are preferably configured on the inner side of the inner housing section 31 (and extend radially into the interior of the housing 30).

The busbar members 1, 2 and/or the turns 12, 22 of the coil windings 11, 21 are close to the opening of the core 4, such that effective insulation must be provided between the former. Preferably, the housing 30, specifically the inner lateral side thereof and/or the first opening side thereof, is shaped such that adjoining busbar members 1, 2 and/or turns 12, 22 of the coil windings 11, 21 are insulated from one another. This is preferably achieved by means of blades 35, which extend from the inner housing section 31 (preferably radially) towards the interior of the housing 30 (i.e. outwardly in relation to the opening axis) between the correspondingly adjoining busbar members 1, 2 and/or turns 12, 22 of the coil windings 11, 21. Preferably, these are the same blades 35, which also position the core 4. However, they can also be configured separately, such that blades are provided for the positioning of the core, and other blades are provided for insulation. The projections 32 and/or blades 35 thus provide a major proportion of the insulation between adjoining busbar members 1, 2 and/or turns 12, 22 of the coil windings 11, 21, with no associated additional step for the assembly of the choke.

The above-mentioned housing 30 is preferably of one-piece construction and/or is configured of a single material. However, it is also possible for the housing 30 to be configured with a multi-part construction. The material of the housing 30 is preferably electrically insulating, and is preferably a plastic.

The choke preferably comprises a structural element 40. The structural element 40 is arranged between the core 4, specifically the second opening side thereof, and the second busbar members 2 or the windings 12, 22 and/or between adjoining second busbar members 2 or adjoining turns 12, 22. The structural element 40 is shaped such that it engages with the second opening side of the core 4, such that the second busbar members 2 (and, where applicable, the terminals 13, 14, 23, 24) can be simply positioned by means of the structural element 40. The structural element 40 is moreover shaped such that it engages with the second opening side of the core 4, such the second busbar members 2 (and, where applicable, the terminals 13,14, 23, 24) can be simply positioned by means of the structural element 40. The structural element 40 and the housing 30 are shaped such that the structural element 40 can only be employed in one position in the housing 30.

The structural element 40 preferably comprises a covering element 41, which is arranged between the core 4, specifically the second opening side thereof, and the second busbar members 2 or the turns 12, 22. The covering element 41 thus preferably covers at least part of the second opening side of the core 4. Specifically, the at least one covered part preferably comprises the region of the second opening side of the core 4, which is covered by the second busbar members 2, such that the covering element 41 insulates the core 4 from the second busbar members 2. Preferably, the covering element is annular, such that it entirely covers the second opening side of the core 4. The covering element 41 extends in the plane of the second opening side of the core 4, or at right angles to the opening axis.

The structural element 40 preferably comprises partitions 42, which extend from the second opening side of the core 4 or from the covering element 41 (preferably at right angles thereto) in the opening direction and/or are arranged such that they are oriented along the side walls of the second busbar members 2. Preferably, one or each second busbar member 2 is delimited by such a partition on both sides (which are arranged at right angles to the second opening side of the core 4). The partition is oriented in parallel with the second busbar member 2, such that the partitions 42 define the position of the second busbar member 2. The partitions are preferably of approximately the same height, preferably higher than the second busbar members 2, such that the partitions 42 project above the second busbar members 2. This improves insulation between two adjoining second busbar members 2, specifically in the inner region, where the second busbar members 2 are in proximity. The partitions 42 preferably extend from the inner edge of the structural element 40 or of the core 4 to the outer edge thereof. For the improvement of stabilization, two adjoining partitions 42 of adjoining second busbar members 2 are connected by connecting walls, thereby constituting a separating structure. The connecting walls are preferably oriented along the inner and outer edge of the structural element 40 or of the core 4. Preferably, the separating structures are open at their upper sides, such that the latter can be filled with a moulding compound. This improves the evacuation of heat from the side walls of the second busbar members 2 and from the second opening side of the core 4.

The structural element 40 preferably comprises further separating elements 43, which extend from the (inner edge of the) structural element 40 or the core 4 into the opening of the core 4. These separating elements 43 are preferably executed in the form of a continuation of one of the two partitions 42 around a second busbar member 2. The separating element 43 insulates adjoining busbar members 1, 2 or turns 12, 22 in the opening region of the core 4. Preferably, the or each separating element 43, in combination with a blade 35, which functions here as a separating element, constitutes a closed partition or insulation between adjoining busbar members 1, 2 or turns 12, 22.

Preferably, at least one of the partitions 44 is arranged between two terminals 14 and 24 of different coil windings 11, 21 and/or is elevated such that it projects out of the moulding compound 6. This permits the improvement of insulation between the two terminals 14, 24, externally to the moulding compound 6.

The above-mentioned structural element 40 is preferably of one-piece construction and/or is configured of a single material. However, it is also possible for the structural element 40 to be configured with a multi-part construction. The material of the structural element 40 is preferably electrically insulating, and is preferably a plastic.

Once the second busbar members 2 and, where applicable, the terminals 13, 14, 23, 24 have been arranged on the structural element 40, the latter only require connection to the corresponding first busbar members 1 (see description above).

Preferably, the housing 30 and/or the structural element 40, together with the core 4 and the at least one coil winding 11, 21, are encapsulated in a moulding compound 6. The moulding compound 6 is applied to a level in the housing 30 such that all conductive parts (with the exception of the terminals 13, 14, 23, 24) are enclosed in the moulding compound 6 or are covered by the latter. The moulding compound 6 restricts vibrations and ensures the effective evacuation of heat. Specifically in combination with the above-mentioned housing 30, an effective compromise is achieved between low weight, the effective evacuation of heat and low vibrations.

FIGS. 7 to 10 represent a second exemplary embodiment of a choke of this type. The choke illustrated is a current-compensated choke, designed for a maximum or nominal current of 80 A. The preceding description also applies to this choke.

FIGS. 11 to 14 represent a third exemplary embodiment of a choke of this type. The choke illustrated is a current-compensated choke, designed for a maximum or nominal current of 200 A. The preceding description also applies to this choke.

The invention claimed is:

1. Choke comprising a core and a first power conductor, wherein the first power conductor comprises a first coil winding having at least one complete turn about the core, said choke further comprises a rigid first busbar member and a rigid second busbar member, the choke further comprises a housing with an inner housing section, wherein the inner housing section comprises at least one projection, wherein the rigid first busbar member is arranged in the at least one projection, wherein the core is annular, and comprises a through-opening with a first opening side and a second opening side arranged opposite the first opening side, an outer lateral side and an inner lateral side, wherein the housing covers the first opening side and the outer lateral side of the core, wherein the at least one projection is arranged on the first opening side and on the outer lateral side, wherein the inner housing section covers the inner lateral side of the core and wherein the inner housing section comprises separating elements, which extend to the core, and are arranged such that the rigid first busbar member and/or the rigid second busbar member is arranged between two adjoining separating elements, wherein the separating elements are configured to isolate the first coil winding.

2. Choke according to claim 1, wherein the rigid first busbar member has a U-shape, which is arranged around the core.

3. Choke according to claim 1, wherein the rigid first busbar member has a first end and a second end, and the rigid second busbar member has a first end and a second end, wherein the rigid first busbar member comprises a first distal side at the first end, a second distal side at the second end and at least one lateral side between the first distal side and the second distal side of the rigid first busbar member, wherein the rigid second busbar member comprises at least one lateral side between the first end and the second end of the rigid second busbar member, wherein the second end of the rigid first busbar member is connected with its second distal side to the first end of the rigid second busbar member, such that the connected first and second rigid busbar members constitute a turn of the first coil winding made from a rigid busbar.

4. Choke according to claim 3, wherein the rigid first busbar member has a U-shape, which is arranged around the core, wherein the second end of the rigid first busbar member incorporates in the second distal side a fixing recess having an internal thread, wherein the first end of the rigid second busbar member incorporates a through-hole extending through at least one of the at least one lateral side of the rigid second busbar member, wherein a threaded bolt extends through the through-hole and is screwed into the internal thread of the fixing recess, such that a bolt head of the threaded bolt compresses the first end of the rigid second busbar member against the second end of the rigid first busbar member.

5. Choke according to claim 4, wherein the threaded bolt is a self-tapping threaded bolt and the internal thread is constituted in the form dictated by the screwing of the self-tapping threaded bolt into the fixing recess.

6. Choke according to claim 5, wherein the self-tapping threaded bolt has a thread flank angle between 30° and 36°, wherein the thread flank angle is constituted between the upper flank facing the bolt head and the lower flank averted from the bolt head, wherein the upper flank angle is greater than the lower flank angle.

7. Choke according to claim 3, wherein the first busbar member assumes a U-shape, wherein the first busbar member comprises a first distal side at the first end, a second distal end at the second end and at least one lateral side between the first distal side and the second distal side of the first busbar member, wherein the second busbar member comprises at least one lateral side between the first end and the second end of the second busbar member, wherein the second distal side of the first busbar member is connected to the first end of the second conductor section by means of a solder paste, wherein the solder paste is preferably configured such that it can be soldered by inductive heating.

8. Choke according to claim 1, wherein a shape of the housing on the first opening side and/or the outer lateral side, interrupted by the at least one projection, matches a shape of the core on the first opening side and/or the outer lateral side.

9. Choke according to claim 1, wherein the inner housing section is hollow, and is open to the first or second opening side.

10. Choke according to claim 7, wherein the housing is encapsulated with the core and the first power conductor, such that the second opening side, together with the at least one second busbar member, is covered by a moulding compound.

11. Choke according to claim 10, wherein the housing is of a cup-shaped design, the outer lateral side of which projects above the electrically conductive parts of the first power conductor, such that the moulding compound injected into the cup-shaped housing covers the electrically conductive parts of the first power conductor, with the exception of any projecting terminals in an insulating manner.

12. Choke according to claim 1, comprising an electrically insulating structural element, which is arranged on the second opening side of the core between the second opening side and the at least one rigid second busbar member.

13. Choke according to claim 12, wherein the structural element covers the second opening side of the core and incorporates a separating structure or at least one partition between two adjoining rigid second busbar members.

14. Choke according to claim 13, wherein the separating structure or the at least one partition comprises a separating element which extends in the direction of the inner housing section and one of the separating elements of the inner housing section, insulates two adjoining turns from one another.

15. Choke according to claim 1, wherein the choke comprises a second power conductor, wherein the second power conductor comprises a second coil winding, having at least one complete turn about the core, wherein at least one of the at least one turns of the second coil winding comprises a rigid first busbar member and a rigid second busbar member.

16. Choke according to claim 15, wherein the first and the second coil windings are wound about the core such that the magnetic fluxes induced in the core by differential-mode currents in the first and second power conductors cancel each other out, such that a current-compensated choke is constituted.

17. Choke according to claim 1, wherein the core is shaped as a hollow cylinder.

18. Choke according to claim 15, wherein the first and/or second power conductor of the choke has a minimum conductor cross-sectional surface area which is greater than 10 mm$^2$, or greater than 20 mm$^2$.

19. Vehicle having a DC voltage network for supplying consumers with electrical energy, wherein the DC voltage network comprises a choke according to claim 1.

* * * * *